United States Patent
Raju et al.

(10) Patent No.: US 10,802,933 B1
(45) Date of Patent: Oct. 13, 2020

(54) MIRRORED BLOCK WITH QUORUM SET MANAGEMENT FOR USE IN TRACKING VALID MIRRORS OF A JOURNAL

(71) Applicant: EMC IP HOLDING COMPANY LLC, Hopkinton, MA (US)

(72) Inventors: Suraj Brahma Raju, Issaquah, WA (US); Ronald Steinke, Tacoma, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 308 days.

(21) Appl. No.: 15/667,134

(22) Filed: Aug. 2, 2017

(51) Int. Cl.
  *G06F 11/00* (2006.01)
  *G06F 11/20* (2006.01)
  *G06F 16/18* (2019.01)

(52) U.S. Cl.
  CPC ...... *G06F 11/2064* (2013.01); *G06F 11/2069* (2013.01); *G06F 16/1865* (2019.01); *G06F 2201/805* (2013.01)

(58) Field of Classification Search
  CPC ............. G06F 11/2064; G06F 16/1865; G06F 11/2069
  See application file for complete search history.

(56) References Cited

U.S. PATENT DOCUMENTS

| | | | | |
|---|---|---|---|---|
| 6,014,669 A | * | 1/2000 | Slaughter | G06F 16/275 707/610 |
| 6,243,744 B1 | * | 6/2001 | Snaman, Jr. | G06F 9/5061 709/220 |
| 6,393,485 B1 | * | 5/2002 | Chao | G06F 11/1482 709/231 |
| 6,662,219 B1 | * | 12/2003 | Nishanov | H04L 29/06 709/209 |
| 7,792,977 B1 | * | 9/2010 | Brower | G06F 9/468 709/229 |

(Continued)

OTHER PUBLICATIONS

EMC IP Holding Company LLC, Method for Tracking Validity of Journal Copies to Allow Journal Mirroring, U.S. Appl. No. 15/667,144 (Year: 2017).*

(Continued)

*Primary Examiner* — Jonathan D Gibson
(74) *Attorney, Agent, or Firm* — Krishnendu Gupta; Nikhil Patel

(57) ABSTRACT

Implementations are provided herein for using a Node State Block ("NSB") to track the validity of various copies of the journal. The NSB can contain states local to the node and be implemented independent of the cluster state, and be readable at node boot time. The NSB can be mirrored to every storage drive within the node. The NSB can contain a generation number and a validity bit. Every time the NSB is updated, the generation number can be incremented. An update must be written to a quorum of drives to be considered committed. At mount time, the NSB is read from all the drives, and the copy with the highest generation number is used. If a quorum of drives cannot be read, the mount fails. Read quorum, or the quorum required at mount when reading the NSB across the set of storage drives requires a strict majority of the storage drives to have valid copies of the NSB. Write quorum, or the quorum required to update the NSB across all storage drives, requires a simple majority of drives.

18 Claims, 11 Drawing Sheets

600

MAINTAINING A NODE STATE BLOCK ("NSB") WITHIN A NODE AMONG A CLUSTER OF NODES, WHEREIN THE NSB CONTAINS A JOURNAL GENERATION SET AND A SET OF GLOBALLY UNIQUE IDENTIFIERS ("GUIDS") CORRESPONDING TO STORAGE DRIVES OF THE NODE  602

↓

MAINTAINING A DRIVE LOCAL COPY OF THE NSB ON EACH STORAGE DRIVE OF THE NODE  604

↓

DETERMINING A VALID JOURNAL STATE BASED ON THE A SET OF THE DRIVE LOCAL COPIES OF THE NSB  606

(56) References Cited

U.S. PATENT DOCUMENTS

| | | | | |
|---|---|---|---|---|
| 8,443,231 | B2* | 5/2013 | Abraham | G06F 11/1425 |
| | | | | 709/220 |
| 8,484,163 | B1* | 7/2013 | Yucel | G06F 11/1415 |
| | | | | 707/640 |
| 9,367,243 | B1* | 6/2016 | Hayes | G06F 11/1076 |
| 10,216,949 | B1* | 2/2019 | McKelvie | G06F 21/6227 |
| 2010/0106813 | A1* | 4/2010 | Voutilainen | G06F 16/27 |
| | | | | 709/221 |
| 2011/0252270 | A1* | 10/2011 | Abraham | G06F 11/1425 |
| | | | | 714/4.1 |
| 2012/0131090 | A1* | 5/2012 | Doddavula | G06F 16/27 |
| | | | | 709/203 |
| 2014/0095813 | A1* | 4/2014 | Shukla | G06F 3/0611 |
| | | | | 711/154 |
| 2016/0299707 | A1* | 10/2016 | Botes | G06F 3/0608 |
| 2017/0177448 | A1* | 6/2017 | Muth | G06F 16/128 |

OTHER PUBLICATIONS

Sanjay Mishra, Microsoft Corp., "Database Mirroring Best Practices and Performance Considerations", published Mar. 10, 2006, SQL Server Technical Article.

* cited by examiner

800

OVERWRITING THE JOURNAL GENERATION SET OF THE DRIVE LOCAL COPY OF THE NSB TO THE MOST RECENT NSB VERSION FOR EACH STORAGE DRIVE OF THE NODE WHOSE DRIVE LOCAL COPY OF THE NSB HAD A STATE OF FAILED READS, BAD DATA, OR TORN WRITES  802

IN RESPONSE TO DETERMINING A THIRD READ QUORUM STATE PASSES QUORUM, UPDATING THE DRIVE LOCAL COPY OF THE NSB TO THE MOST RECENT NSB VERSION FOR EACH STORAGE DRIVE OF THE NODE WHOSE DRIVE LOCAL COPY OF THE NSB HAD INCONSISTENT INTERNAL GENERATION NUMBERS  804

IN RESPONSE TO DETERMINING A FOURTH READ QUORUM STATE PASSES QUORUM, PROCESSING TWO NSB UPDATES  806

IN RESPONSE TO DETERMINING A FIFTH READ QUORUM STATE PASSES QUORUM, COMPLETING ANY UPDATES TO THE SET OF GUIDS IN THE NSB WHICH WERE INTERRUPTED BY A PANIC  808

IN RESPONSE TO DETERMINING A SIXTH READ QUORUM STATE PASSES QUORUM, MOUNTING THE NODE  810

IN RESPONSE TO DETERMINING ONE OF THE FIRST READ QUORUM STATE, THE SECOND READ QUORUM STATE, THE THIRD READ QUORUM STATE, THE FOURTH READ QUORUM STATE, THE FIFTH READ QUORUM STATE, OR THE SIXTH READ QUORUM FAILING TO PASS QUORUM, FAILING THE MOUNT  812

```
┌─────────────────────────────────────────────────────────────────────┐
│ MAINTAINING A NODE STATE BLOCK ("NSB") WITHIN A NODE AMONG A CLUSTER OF │
│  NODES, WHEREIN THE NSB CONTAINS A JOURNAL GENERATION SET AND A SET OF │
│ GLOBALLY UNIQUE IDENTIFIERS ("GUIDS") CORRESPONDING TO STORAGE DRIVES OF │
│                              THE NODE                           902 │
└─────────────────────────────────────────────────────────────────────┘
                                    ▼
┌─────────────────────────────────────────────────────────────────────┐
│    MAINTAINING A DRIVE LOCAL COPY OF THE NSB ON EACH STORAGE DRIVE OF THE │
│                               NODE                              904 │
└─────────────────────────────────────────────────────────────────────┘
                                    ▼
┌─────────────────────────────────────────────────────────────────────┐
│ DETERMINING A VALID JOURNAL STATE BASED ON THE A SET OF THE DRIVE LOCAL │
│                        COPIES OF THE NSB                        906 │
└─────────────────────────────────────────────────────────────────────┘
                                    ▼
┌─────────────────────────────────────────────────────────────────────┐
│                 TAKING AN EXCLUSIVE LOCK ON THE NSB             908 │
└─────────────────────────────────────────────────────────────────────┘
                                    ▼
┌─────────────────────────────────────────────────────────────────────┐
│                 INCREMENTING THE JOURNAL GENERATION SET         910 │
└─────────────────────────────────────────────────────────────────────┘
                                    ▼
┌─────────────────────────────────────────────────────────────────────┐
│  IN RESPONSE TO DETERMINING A FIRST WRITE QUORUM STATE PASSES QUORUM, │
│ OVERWRITING A DRIVE LOCAL COPY OF THE NSB ON EACH STORAGE DRIVE OF THE │
│        NODE WITH THE INCREMENTED JOURNAL GENERATION SET         912 │
└─────────────────────────────────────────────────────────────────────┘
```

FIG. 9

MIRRORED BLOCK WITH QUORUM SET MANAGEMENT FOR USE IN TRACKING VALID MIRRORS OF A JOURNAL

FIELD OF THE INVENTION

This invention relates generally to processing data, and more particularly to systems and methods for mirroring copies of a transaction journal and validating those copies.

BACKGROUND OF THE INVENTION

Distributed file systems offer many compelling advantages in establishing high performance computing environments. One example is the ability to easily expand, even at large scale. An example distributed file system is one that is distributed across multiple nodes in a cluster of nodes. An individual node can encompass a set of storage drives capable of storing data accessible by clients of the clusters of nodes. In some distributed file systems, files or objects can striped across different physical storage devices in a single node or across multiple nodes of a cluster. With multiple clients capable of interacting and requesting operations on files to multiple nodes, many times there are operations that are executed by multiple threads, processes and applications distributed across one or more nodes. For example, more than one thread or process may demand to concurrently write data to the same file in a file system.

In a distributed file system, such as a cluster of nodes, file system operations can be viewed as multi-layered. The first layer decodes what the operation is trying to accomplish, including assessing which nodes, including the node processing the operation, among the cluster of nodes are storing data that the operation is dependent on. As the operation progresses, a journal can be used as a means to provide more guarantees for requested operations, by first having the operations logged into a journal, (e.g., an in-memory storage space such as a cache or a buffer cache), and then later committing the operations logged in the journal to stable disk storage.

The journal can provide a reliable write-back cache for filesystem disk updates. It can remember the disk updates and re-write them in the event of a power failure or a write failure. This can aid in providing file system consistency in the event of a crash. A bad or corrupted journal can result in data loss, which can require the node containing the bad journal to undergo a rebuild before offering normal functionality. One way to prevent the corruption or loss of a journal is to mirror the journal in multiple locations. If one copy of the journal is corrupted, a mirrored copy of the journal can be used to avoid a lengthy rebuild of the node. However, as the journal is dynamically updated during filesystem operation, it is important to establish a cadence of how and when copies of the journal are mirrored along with establishing internal guarantees for which mirrored copies of the journal are valid.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a node state block ("NSB") can be maintained within a node among a cluster of nodes, wherein the NSB contains a journal generation set and a set of Globally Unique identifiers ("GUIDs") corresponding to storage drives of the node. A drive local copy of the NSB can be maintained on each storage drive of the node. It can be determined whether there is a valid journal state based on the set of the drive local copies of the NSB.

In accordance with another aspect, a first read quorum state can be determined based on the set of the drive local copies of the NSB. In response to the first read quorum state achieving quorum, the journal generation set can be read from each drive local copy of the NSB. In response to determining that the journal generation set on a storage drive of the node has at least one of a read error, a checksum failure, or inconsistent internal generation numbers, the drive can be excluded from a second read quorum state. In response to the second read quorum state passing quorum, the NSB to the journal generation can be set to a most recent NSB version associated with the second read quorum state.

In accordance with another aspect, the journal generation set of the drive local copy of the NSB can be overwritten to the most recent NSB version for each storage drive of the node whose drive local copy of the NSB had a state of failed reads, bad data, or torn writes. In response to determining a third read quorum state passes quorum, the drive local copy of the NSB can be updated to the most recent NSB version for each storage drive of the node whose drive local copy of the NSB had inconsistent internal generation numbers. In response to determining a fourth read quorum state passes quorum, two NSB updates can be processed.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

BRIEF DESCRIPTION OF THE DRAWINGS

FIG. 8 illustrates an example flow diagram method for updating node state blocks of storage devices within a cluster of nodes including excluding drives from quorum that fail due to error in accordance with implementations of this disclosure;

FIG. 9 illustrates an example flow diagram method for updating a node state block in accordance with implementations of this disclosure;

DETAILED DESCRIPTION

Figure 1:
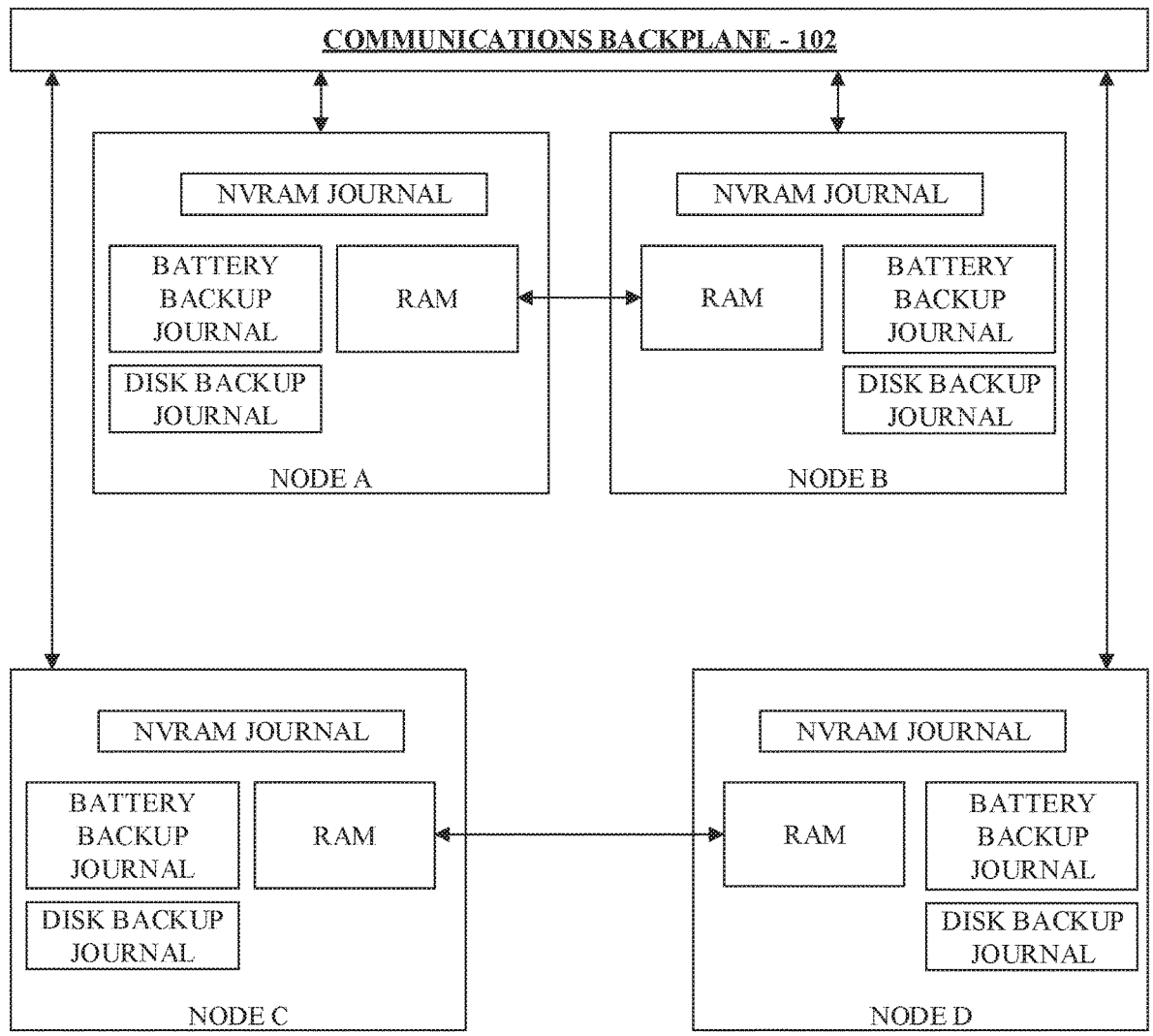
FIG. 1 illustrates an example cluster of nodes where nodes are paired with a buddy node in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

U.S. Patent Application Ser. No. 13/461,637 Titled "Multiple Writers to a Single File", U.S. Pat. No. 7,752,402 titled "Systems and Methods for Allowing Incremental Journaling", U.S. Pat. No. 7,676,691 titled "Systems and Methods for Providing Nonlinear Journaling", U.S. Pat. No. 7,822,932 titled "Systems and Methods for Providing Nonlinear Journaling", U.S. Pat. No. 7,899,800 titled "Systems and Methods for Providing Nonlinear Journaling", U.S. Pat. No. 7,346,720 titled "Systems and Methods for Managing Concurrent Access Requests to a Shared Resource", and U.S. Patent Application Ser. No. 14/585,992 titled "Method for Sub-Block Operations on a Journal Block Using Range Locking", are hereby incorporated by reference.

As used herein, the term "node" refers to a physical computing device, including, but not limited to, network devices, servers, processors, cloud architectures, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

The term "cluster of nodes" refers to one or more nodes that operate together to form a distributed file system. In one example, a cluster of nodes forms a unified namespace for a distributed file system. Nodes within a cluster may communicate information about nodes within the cluster to other nodes in the cluster. Nodes among the cluster of nodes function using the same logical inode number "LIN" mappings that reference unique inodes that contain the physical location(s) of the data stored within the file system. For example, processes can use unique LIN's to reference the associated inode that can contain a data tree that maps the logical block numbers to the actual physical location(s) of the block file data for a file within the file system. In one implementation, nodes among the cluster of nodes run a common operating system kernel. Clients can connect to any one node among the cluster of nodes and access data stored within the cluster. For example, if a client is connected to a node, and that client requests data that is not stored locally within the node, the node can then load the requested data from other nodes of the cluster in order to fulfill the request of the client. Data protection plans can exist that stores copies or instances of file system data striped across multiple drives in a single node and/or multiple nodes among the cluster of nodes, thereby preventing failures of a node or a storage drive from disrupting access to data by the clients. Metadata, such as inodes, for an entire distributed file system can be mirrored and/or synched across all nodes of the cluster of nodes.

The term "journal" refers to reliable high-speed front-end for disk writes, which can implement coherent transactions locally and rewrite data after power failure or write failure. Requests for disk writes are acknowledged immediately by the journal; however, the data is not actually written to stable storage for an unknown amount of time after the write has been acknowledged. Without a journal, the node can be in an unknown state after a power or write failure. In other words, the contents of the disks (within the node) are no longer reliable because it is not known whether the data was actually written to the disks before the failure occurred. A journal may be used to return the node back into a known state. A system equipped with a journal records in the journal the disk writes to the node over a period of time. After a power or write failure, the system accesses the journal to reissue the writes before the node is used again. In addition to providing reliable writes, a journal system may also implement transactions. A collection of blocks may be written under a single transaction, writing either all of the blocks or no blocks. This feature may also be used in a global transaction system to implement cluster wide transactions. In a cluster wide transaction, journals on multiple nodes can be synchronized such that a transaction on each node associated with a single global transaction either commits or aborts.

One implementation is to use a non-volatile random-access memory ("NVRAM") to store the active node local journal. NVRAM can retain its information even when power is lost. However, when storing the journal on NVRAM, NVRAM failure can become a single point of failure if it fails. Therefore, if the NVRAM fails, the node often needs to be rebuilt. It can be appreciated that during node rebuild, the node is not available to perform client or system tasks. The node must leave the cluster, be repaired, be re-added to the cluster, and data must be re-striped to the node as if the node is joining the cluster from scratch. This rebuilding process can take a long period of time. It can be further appreciated that the denser the node (e.g., the more storage space the node has), the longer it may take to rebuild the node, and the higher the probability for data loss.

As NVRAM failure, in one example, can lead to node-loss, there is a need to mirror the journal to other locations so if the NVRAM does fail, the node can be brought back up using the mirrored copy of the journal and avoid having to rebuild the node. There also exists the need to store the mirror copy of the journal outside the node itself, such that if the node completely fails, the journal is still recoverable.

Referring now to FIG. 1, there is illustrated an example cluster of nodes where nodes are paired with a buddy node in accordance with implementations of this disclosure. Generally, a node is a computing device with a modular design optimized to minimize the use of physical space and energy. A node can include processors, power blocks, cooling apparatus, network interfaces, input/output interfaces, etc. Although not shown, a cluster of nodes typically includes several computers that merely require a network connection and a power cord connection to operate. Each node computer often includes redundant components for power and interfaces. The cluster of nodes as depicted shows Nodes A, B, C, and D operating in a cluster; however, it can be appreciated that more or less nodes can make up a cluster. Communications backplane 102 can be any type of commercially available networking infrastructure that allows nodes among the cluster of nodes to communicate amongst each other in as close to real time as the networking infrastructure allows. It can be appreciated that the backplane 102 can also have a separate power supply, logic, I/O, etc. as necessary to support communication amongst nodes of the cluster of nodes. Nodes can refer to a physical enclosure with a varying amount of CPU cores, random access memory, flash drive storage, magnetic drive storage, etc. For example, a single Node could contain, in one example, 36 disk drive bays with attached disk storage in each bay. It can be appreciated that nodes within the cluster of nodes can have varying configurations and need not be uniform.

Node A, Node B, Node C and Node D are all connected to communications backplane 102 to form a cluster of nodes operating as a distributed filesystem. Node A is a buddy node of Node B, and Node B is a buddy node of Node A. Similarly, Node C is a buddy node of Node D, and Node D is a buddy node of Node C. It can be appreciated that buddies node can be physically located adjacent to each other in a rack or chassis and can be connected by a port, for example, a PCI-E bus connected to a mid-plane. It can be appreciated that this mid-plane connection is separate and distinct from the communications backplane 102. By establishing a physical mid-plane connection between a buddy node pair, each node in the pair can have visible access to the RAM of the buddy node, such that, when the NVRAM of the local node is updated, the updated changes are also mirrored to the buddy node over the mid-plane connection.

In one implementation, each node in the cluster of nodes can have a copy of their journal stored in 3 location: (1) in the local NVRAM of the node; (2) a disk backup copy of the journal in the stable storage of the node; and (3) in a battery backup drive, for example, an battery powered M2 drive device that upon power failure, the contents of the NVRAM can automatically be copied to the battery backup drive.

In one implementation, each node can mirror a copy of their node local journal on the buddy node is the same three locations within the buddy node. For example, the node local journal for Node A can be stored in 6 locations: (1) in the NVRAM of Node A; (2) in a disk backup location of Node A; (3) in a battery backup drive within Node A; (4) in the NVRAM of Node B; (5) in a disk backup location of Node B; and (6) in a battery backup drive within Node B.

It can be appreciated that with, in one implementation, six copies of a journal existing at any one time, there exists a need to identify which copies of the journal are valid. If a node needs to be restored, it is desirable that the most up to date and valid copy of the journal be identified. For example, suppose in servicing Node A in FIG. 1, a technician removes disks from the node and then puts the disks back into a different mode by mistake. There could exist copies of the journal on the wrongly inserted disk that are inapplicable to the node.

Implementations are provided herein for using a Node State Block ("NSB") to track the validity of various copies of the journal. The NSB can contain states local to the node and be implemented independent of the cluster state, and be readable at node boot time. The NSB can be mirrored to every storage drive within the node. The NSB can contain a generation number and a validity bit. Every time the NSB is updated, the generation number can be incremented. An update must be written to a quorum of drives to be considered committed. At mount time, the NSB is read from all the drives, and the copy with the highest generation number is used. If a quorum of drives cannot be read, the mount fails. Read quorum, or the quorum required at mount when reading the NSB across the set of storage drives requires a strict majority of the storage drives to have valid copies of the NSB. Write quorum, or the quorum required to update the NSB across all storage drives, requires a simple majority of drives.

In one implementation, the NSB reserves two blocks on every drive in the system and uses them to store state information. Two blocks can be used instead of one so that updates can avoid overwriting the most recent NSB state on each drive. Each drive can also store a list of all the other drives in the system identified by a globally unique identified ("GUID"). This list can track whether each drives is or is not part of the quorum set that was used the previous time the NSB was updated. When a storage drive is added or removed by the node, the quorum set can be changed to reflect the new set of drives. Changing the quorum set can require updating the NSB twice. The first update must satisfy a quorum with respect to both the old and new drive sets, while the second update can only satisfy quorum with respect to the new drive set. The list of drives stored in the NSB can be updated as described with respect to FIG. 5.

It can be appreciated that by maintaining the previous state of the NSB on each drive, it can allow the system to recover from torn writes if the node goes down halfway through an NSB update. For example, a torn write can be detected because the process calls for separately establishing a checksum of every physical layer disk block in the logical block that is written for the NSB, and generation numbers are also recorded. A torn write can be determined where all the checksums are valid but the generation numbers don't match. In the case of a torn write, the previous NSB state can be used towards establishing quorum.

FIGS. 2-10 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Figure 2:
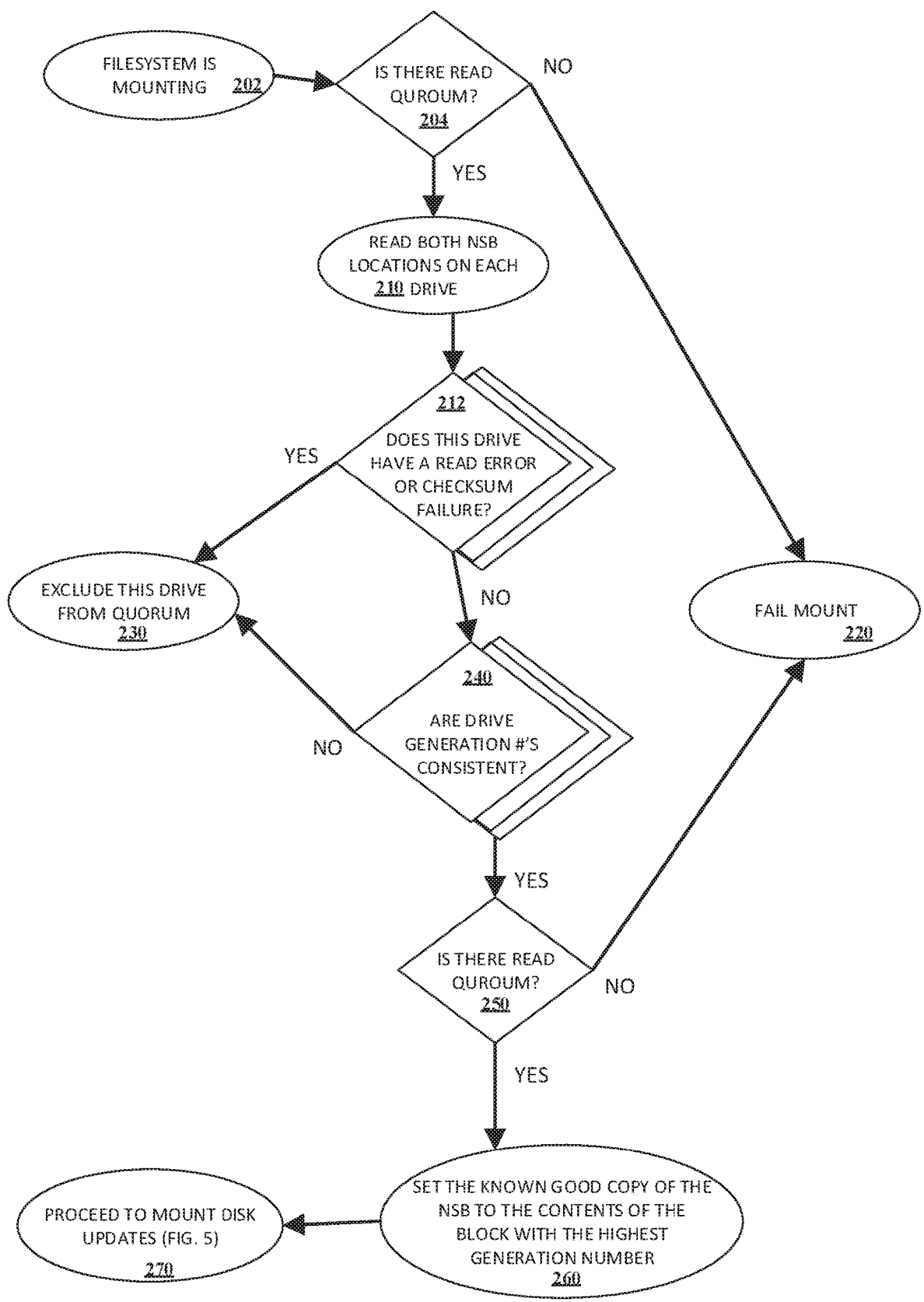
FIG. 2 illustrates an example flow diagram method for reading a set of node state blocks at mount in accordance with implementations of this disclosure.

Referring now to FIG. 2, there is illustrated an example flow diagram method for reading a set of node state blocks at mount in accordance with implementations of this disclosure. At 202, the filesystem begins mounting a node. At 204, it can be determined whether the node has read quorum. For example, the NSB stored on each of the drives identified in the NSB can be read. The generation numbers stored on each drive can be identified and it can be determined whether a strict majority of the drives have a common generation number. If a strict majority of the drives have a common generation number, there is read quorum and the method can proceed to step 210. If there is not a strict majority, the method proceeds to step 220 and the mount fails.

At 210, both NSB locations can be read on each drive. As stated above, the NSB can hold the current state and the previous state of the generation number. We can use the 2 states to identify failed reads, checksum errors, bad header data, bad magic, unknown versions, and bad sectors.

At 212, it can be determined whether the drive has a read error, a checksum failure or a bad header. For example, the system can explicitly checksum each disk sector separately to identify checksum errors in the generation data. If the NSB data for a drive fails the test at 212, the method proceeds to step 230 and the drive is excluded from quorum. If the NSB data for the drive passes the tests at 212, the method proceeds to step 240.

At 240, it can be determined whether the generation numbers are consistent. As stated above, a torn write can be detected because the process calls for separately establishing a checksum of every physical layer disk block in the logical block that is written for the NSB, and generation numbers are also recorded. A torn write can be determined where all the checksums are valid (e.g., the drive has passed the tests at step 212) but the generation numbers don't match. If the generation numbers are inconsistent, the drive is excluded from quorum.

At 250, it can be determined whether the set of drives in the NSB still allow for read quorum. If there is not a strict majority of drives that have a common generation number and weren't excluded from quorum at step 230, the method proceeds to step 220 and the mount fails. If there is a strict majority of drives that have a common generation number and weren't excluded from quorum at step 230, the method can proceed to step 260.

At step 260, the method can set the known good copy of the NSB to the contents of the block with the highest generation number. At 270, the method can proceed mount disk updates which will proceed with updating disks on the node with the known good copy of the journal.

Figure 3:
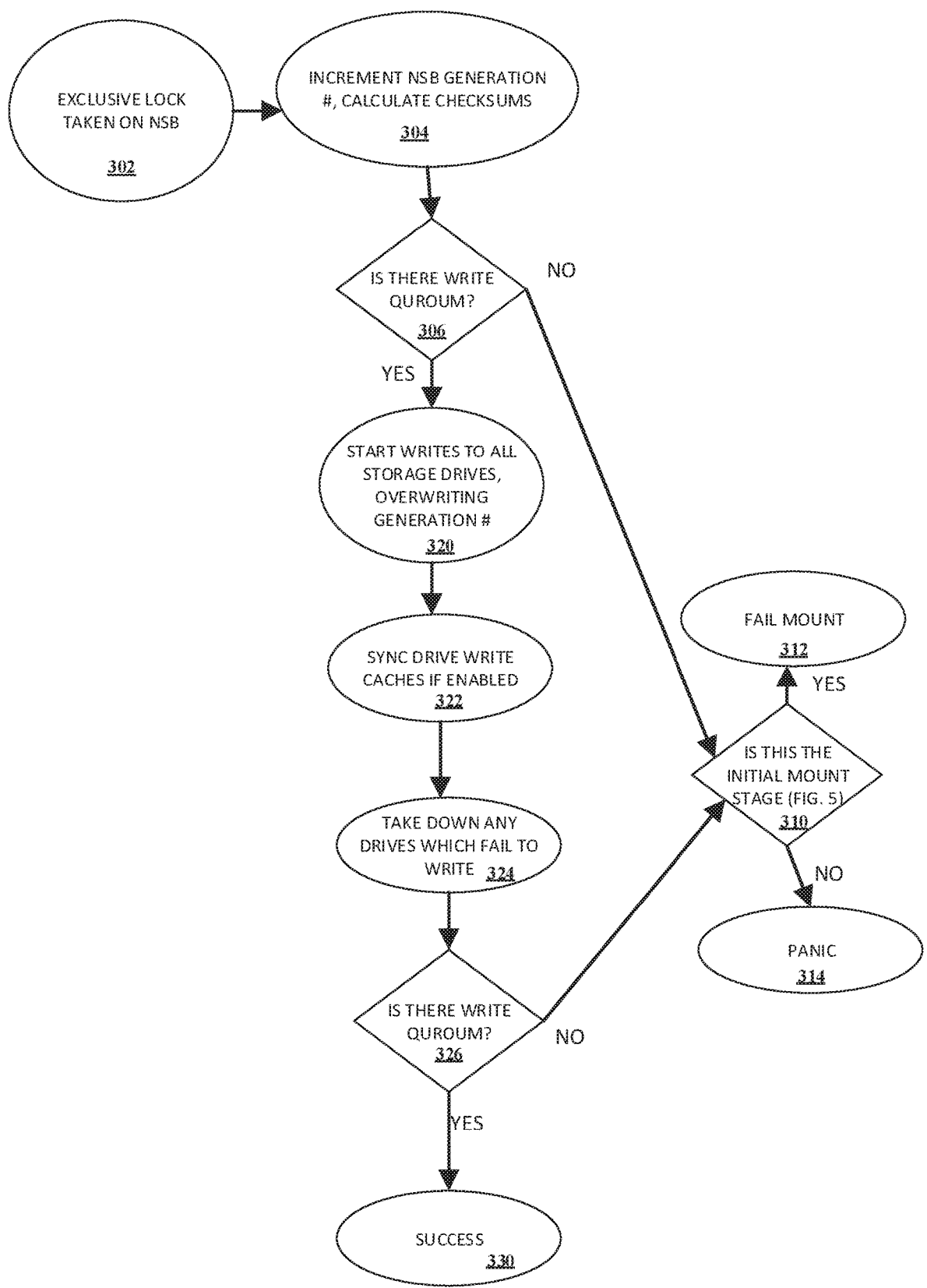
FIG. 3 illustrates an example flow diagram method for updating a set of node state blocks in accordance with implementations of this disclosure.

Referring now to FIG. 3, there is illustrated an example flow diagram method for updating a set of node state blocks in accordance with implementations of this disclosure. At 302, an exclusive lock can be taken on the NSB. At 304, the NSB generation number can be incremented, and checksums can be calculated for the incremented generation number. At 306, it can be determined whether a simple majority of drives have a common generation number and therefore there is write quorum. If there is not write quorum, the method can proceed to step 310. If there is write quorum, the method can proceed to step 320.

At 320, the NSB data on each storage drive in the node can be overwritten with the incremented NSB generation number. At 322, the write caches of each drive can be synced if enabled. At 324, drives which fail to write the incremented NSB data can be taken down. At 326, it can be determined whether there is still write quorum after any drives are taken down at step 324. If there is not write quorum, the method can proceed to step 310. If there is write quorum, the method ends at step 330 as a success.

Figure 5:
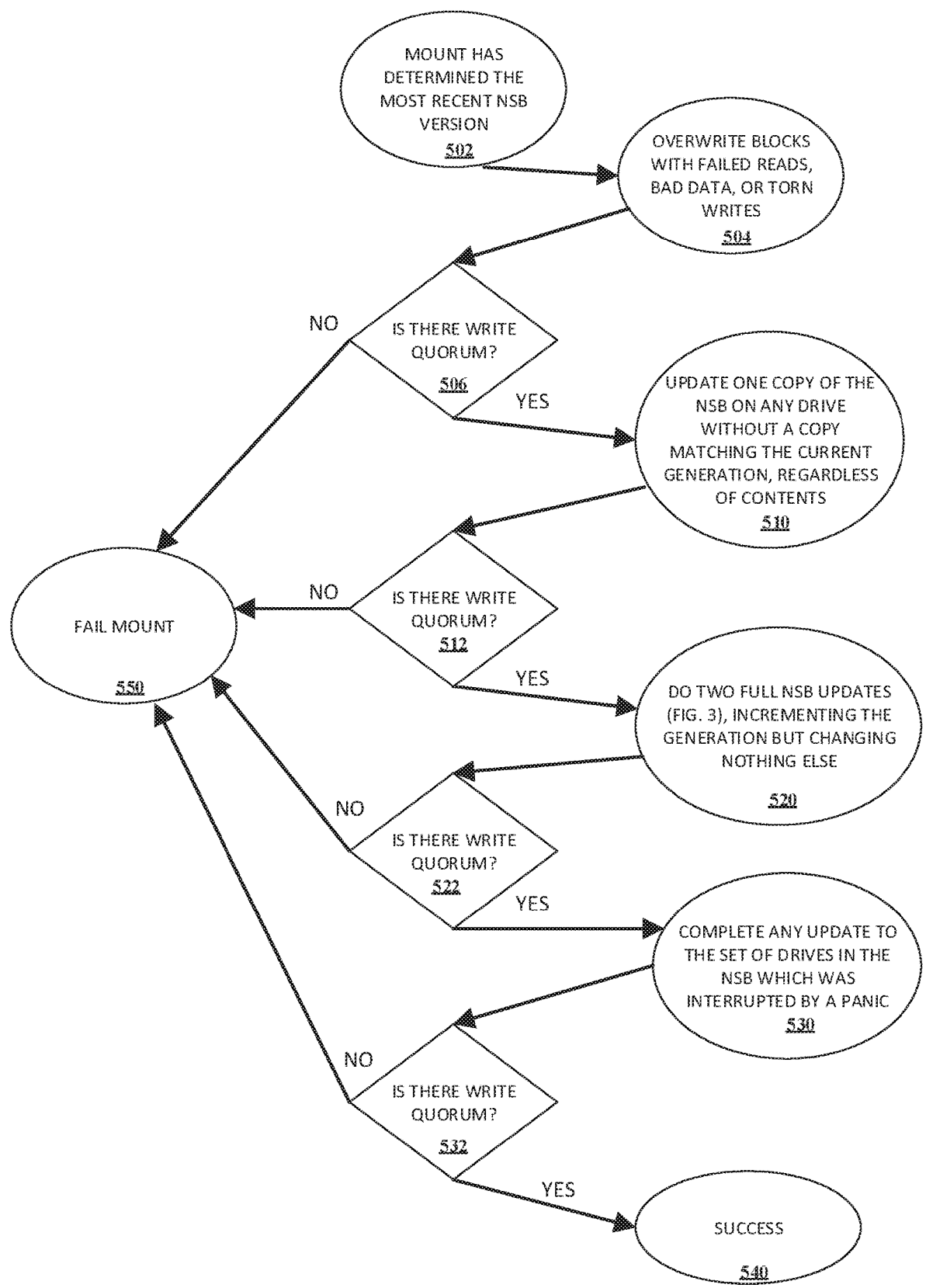
FIG. 5 illustrates an example flow diagram method for updating a set of node state blocks at mount in accordance with implementations of this disclosure.

At 310, it can be determined whether this updating NSB generation numbers is a part of the initial mount stage as described with respect to FIG. 5. If it is, the mount will fail at 312. If this is not part of the initial mount stage, the node will panic at step 314.

Figure 4:
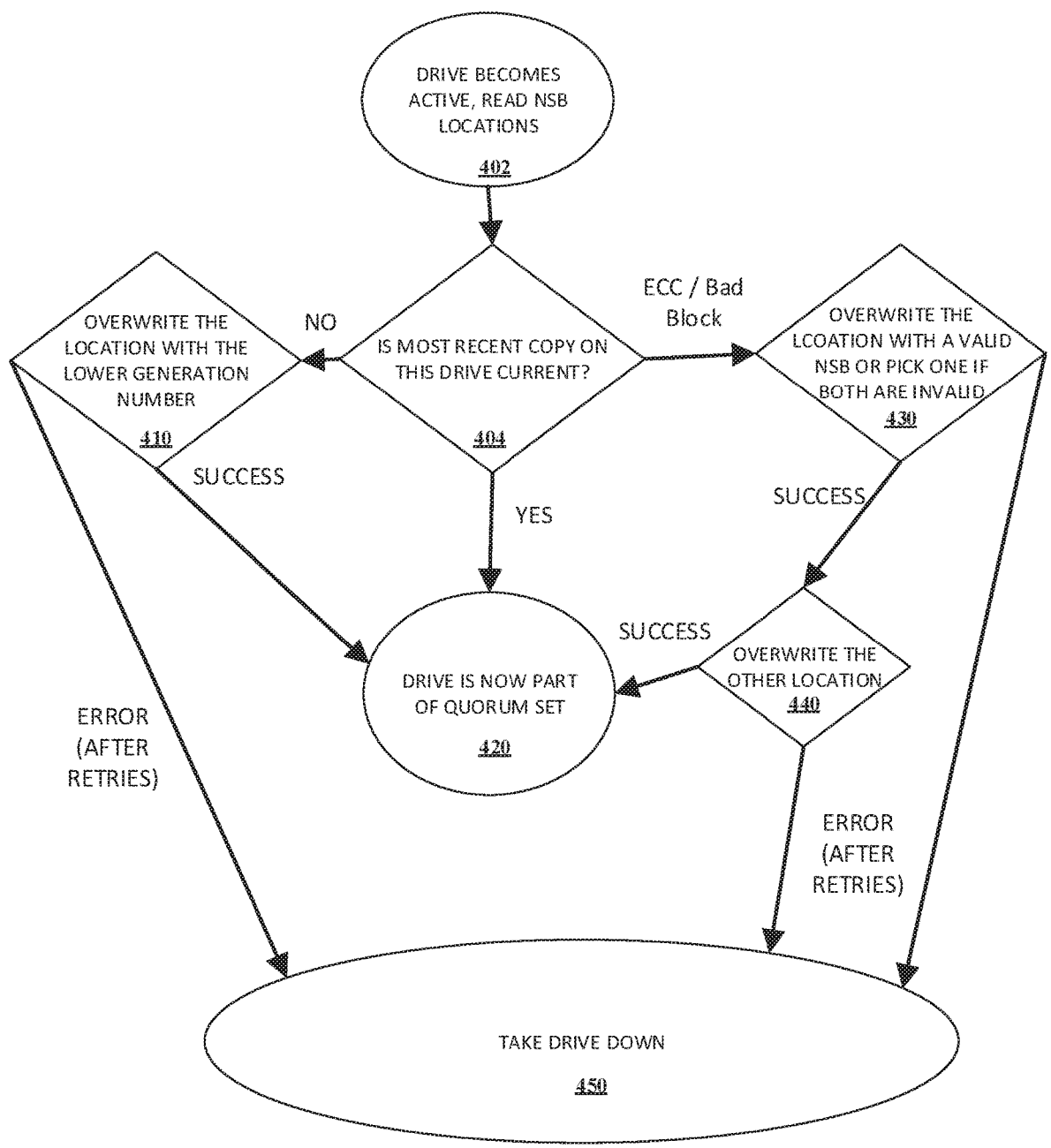
FIG. 4 illustrates an example flow diagram method for handling a new storage drive in accordance with implementations of this disclosure.

Referring now to FIG. 4, there is illustrated an example flow diagram method for handling a new storage drive in accordance with implementations of this disclosure. At 402, a drive becomes active and the NSB locations on the drive can be read. At 404, it can be determined whether the NSB data on the drive is current. If the NSB on the drive is not current, but the block passes ECC and does not have a bad block, the method proceeds to step 410. If the NSB on the drive is current, the method proceeds to step 420 at the drive is now a part of the quorum set. If the NSB does not pass ECC or contains a bad block, the method proceeds to step 430.

At 410, one of the two generation state blocks can be overwritten corresponding to the lower generation block. If there is an error in overwriting the portions of the NSB, the method proceeds to step 450 and the drive is taken down. If the overwriting at step 410 is successful, the method proceeds to step 420 and the drive is now a part of the quorum set.

At step 430, the location with a valid NSB generation number can be overwritten, or if both NSB generation numbers are invalid due to ECC or a bad block, either can be overwritten. If the overwriting is unsuccessful, the method can proceed to step 450 and the drive can be taken down. If the overwriting is successful, the method can proceed to step 440 and the other NSB generation location can be overwritten at 440. If the overwriting at 440 is successful, the method proceeds to step 420 and the drive is now a part of the quorum set. If the overwriting is unsuccessful, the method proceeds to step 450 and the drive is taken down.

Referring now to FIG. 5, there is illustrated an example flow diagram method for updating a set of node state blocks at mount in accordance with implementations of this disclosure. It can be appreciated that once the filesystem is mounted and passed read quorum with respect to the most recent NSB, the remaining drives in the node that were not a part of read quorum should be updated to reflect the most recent NSB version. At 502, mount has determined the most recent NSB version. At 504, drives that were failed out of read quorum in FIG. 2 due to failed reads, bad data, or torn writes should be overwritten with the most recent NSB version. At 506, we can determine whether we still have write quorum, e.g., a simple majority of drives in the cluster having a common generation number. If the system loses write quorum, the mount fails at step 550. If the system has write quorum, the method proceeds to step 510.

At 510, one of the NSB can be updated on any drive without a copy matching the current generation, regardless of the drives NSB contents. At 512, it can be determined whether there is write quorum. If there is no longer write quorum, the method proceeds to step 550 and the mount fails. If there is write quorum, the method proceeds to step 520.

At 520, two full NSB updates (as shown in FIG. 4 with respect to new drives being added) can be processed by bumping the generation number but otherwise not changing the contents of the NSB. At 522, it can be determined whether there is write quorum. If there is no longer write quorum, the method proceeds to step 550 and the mount fails. If there is write quorum, the method proceeds to step 530.

It can be appreciated that having read quorum during the initial read of the block (see FIG. 2) does not guarantee that no higher generation number exists on any of the disks. If some drives are down, and an update started but did not complete the last time the node was up, some drives may have a newer version of the NSB from the partial update, with a generation number one more than the highest we see on any of the up drives. Alternatively, the highest generation number we see may not have been written to a quorum of drives, and may not be visible if the node goes down and comes back up with a different set of drives. To guarantee the version of the NSB we report on the initial read does not roll back, the system can do two full updates of the NSB if any drives are down when we initially read the block, incrementing the generation number each time but leaving the data unchanged. It can be further appreciated that doing two separate updates instead of bumping the generation number by two solves an example issue where the node goes down during the initial update. This process can guarantee that the final version that is written in the drive NSB's have a higher generation number than any copy written during a previous mount. After this, the in-memory current version of the NSB is guaranteed to be used should the node panic, and can be reported to other parts of the filesystem.

At 530, an update can be completed for the set of drives in the NSB which was interrupted by a panic. At 532, it can be determined whether there is write quorum. If there is no longer write quorum, the method proceeds to step 550 and the mount fails. If there is write quorum, the method proceeds to step 540 and the updates are deemed a success.

Figure 6:
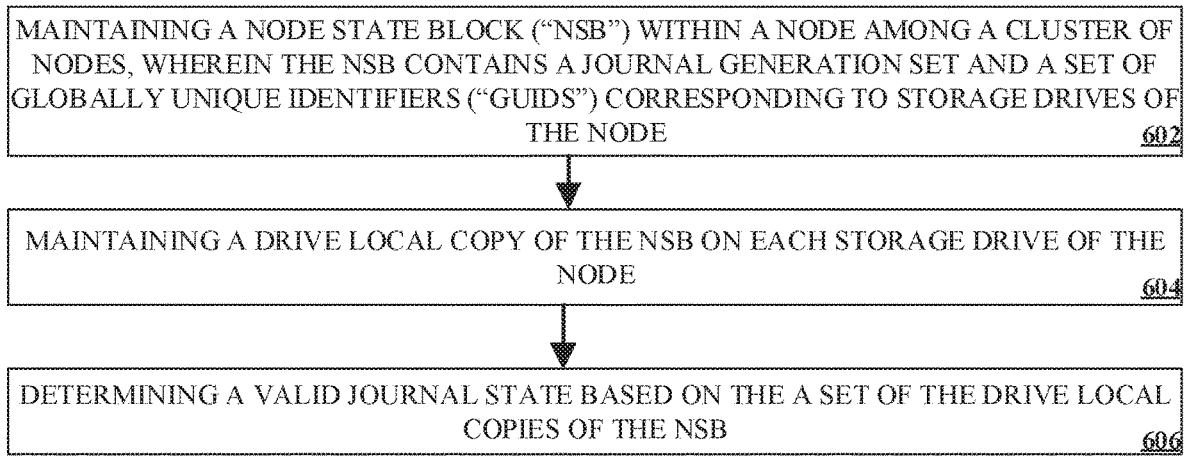
FIG. 6 illustrates an example flow diagram method for determining a valid journal state within a cluster of nodes in accordance with implementations of this disclosure.

FIG. 6 illustrates an example flow diagram method for determining a valid journal state within a cluster of nodes in accordance with implementations of this disclosure. At 602, a node with a cluster of nodes can maintain an NSB, wherein the NSB contains a journal generation set and a set of globally unique identifiers corresponding to the storage drives of the node. At 604, a drive local copy of the NSB can be maintained on each storage drive of the node. At 606, a valid journal state can be determined based on the set of the drive local copies of the NSB.

Figure 7:
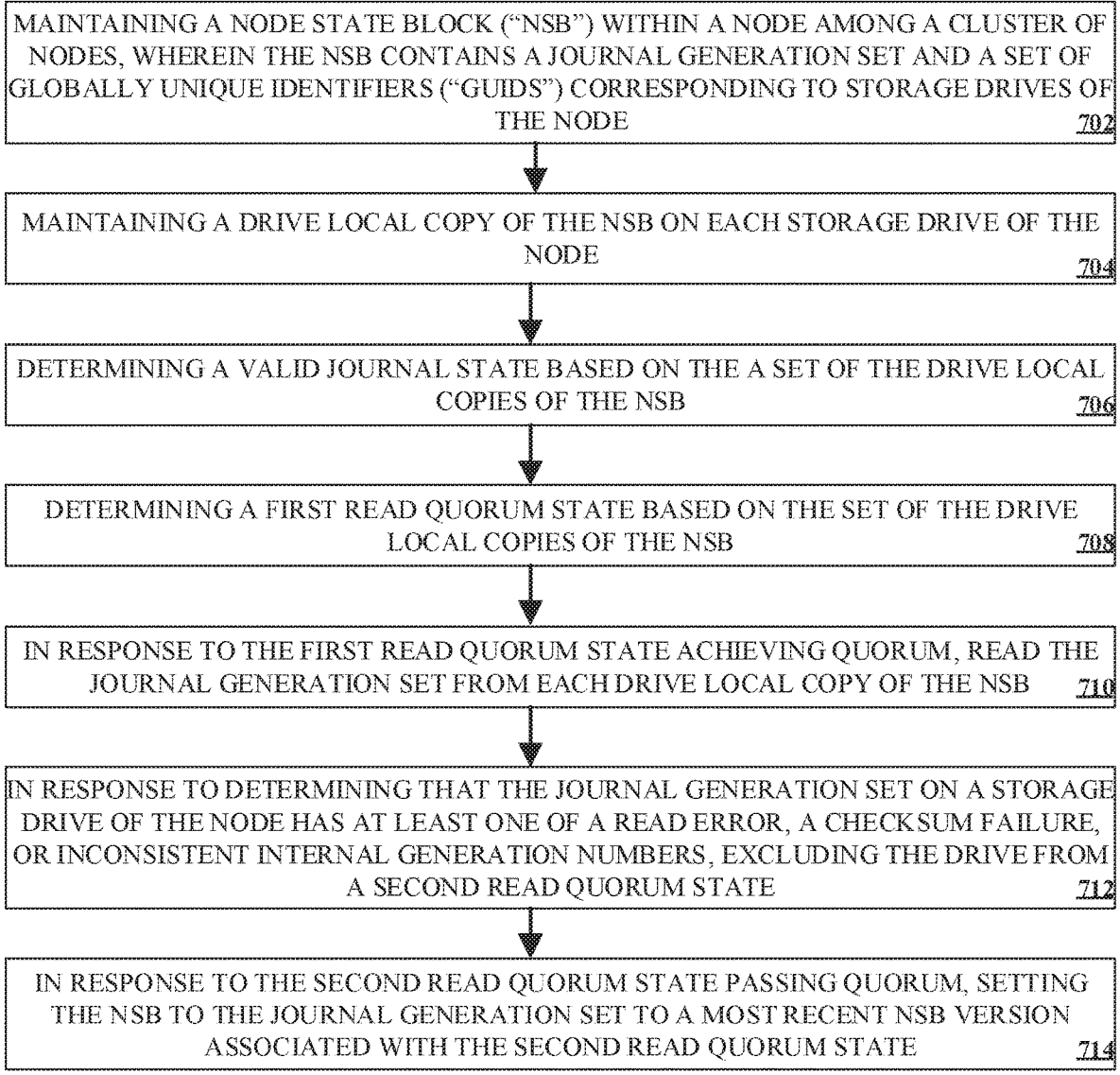
FIG. 7 illustrates an example flow diagram method for determining a valid journal state within a cluster of nodes including excluding drives from quorum that fail due to error in accordance with implementations of this disclosure.

FIG. 7 illustrates an example flow diagram method for determining a valid journal state within a cluster of nodes including excluding drives from quorum that fail due to error in accordance with implementations of this disclosure. At 702, a node with a cluster of nodes can maintain an NSB, wherein the NSB contains a journal generation set and a set of globally unique identifiers corresponding to the storage drives of the node. At 704, a drive local copy of the NSB can be maintained on each storage drive of the node. At 706, a valid journal state can be determined based on the set of the drive local copies of the NSB.

At 708, a first read quorum state can be determined based on the set of the drive local copies of the NSB.

At 710, in response to the first read quorum state achieving quorum, the journal generation set from each drive local copy of the NSB can be read.

At 712, in response to determining that the journal generation set on a storage drive of the node has at least one of a read error, a checksum failure, or inconsistent internal generation numbers, the drive can be excluded from a second read quorum state.

At 714, in response to the second read quorum state passing quorum, the journal generation of the NSB can be set to a most recent NSB version associated with the second read quorum state.

FIG. 8 illustrates an example flow diagram method for updating node state blocks of storage devices within a cluster of nodes including excluding drives from quorum that fail due to error in accordance with implementations of this disclosure. In one implementation, Steps 602-606 as discussed above with respect to FIG. 6 can occur prior to Step 802.

At 802, the journal generation set of the drive local copy of the NSB can be overwritten to the most recent NSB version for each storage drive of the node whose drive local copy of the NSB had a state of failed reads, bad data, or torn writes.

At 804, in response to determining a third read quorum state passes quorum, the drive local copy of the NSB can be updated to the most recent NSB version for each storage drive of the node whose drive local copy of the NSB had inconsistent internal generation numbers.

At 806, in response to determining a fourth read quorum state passes quorum, two NSB updates can be processed. In one implementation, the two NSB updates can strictly update the generation number of the NSB and leave all other contents of the NSB in place.

At 808, in response to determining a fifth read quorum state passes quorum, any updates tot eh set of GUID's in the NSB that were interrupted by a panic can be updated.

At 810, in response to determining a sixth read quorum state passes quorum, the node can be mounted.

At 812, in response to determining one of the first read quorum state, the second read quorum state, the third read quorum state, the further read quorum state, the fifth read quorum state, or the sixth read quorum state fail to pass quorum, the mount can be failed.

FIG. 9 illustrates an example flow diagram method for updating a node state block in accordance with implementations of this disclosure. At 902, a node with a cluster of nodes can maintain an NSB, wherein the NSB contains a journal generation set and a set of globally unique identifiers corresponding to the storage drives of the node. At 904, a drive local copy of the NSB can be maintained on each storage drive of the node. At 906, a valid journal state can be determined based on the set of the drive local copies of the NSB.

At 908, an exclusive lock can be taken on the NSB.

At 910, the journal generation set can be incremented.

At 912, in response to determining a first write quorum passes quorum, a drive local copy of the NSB on each storage drive of the node can be overwritten with the incremented journal generation set.

Figure 10:
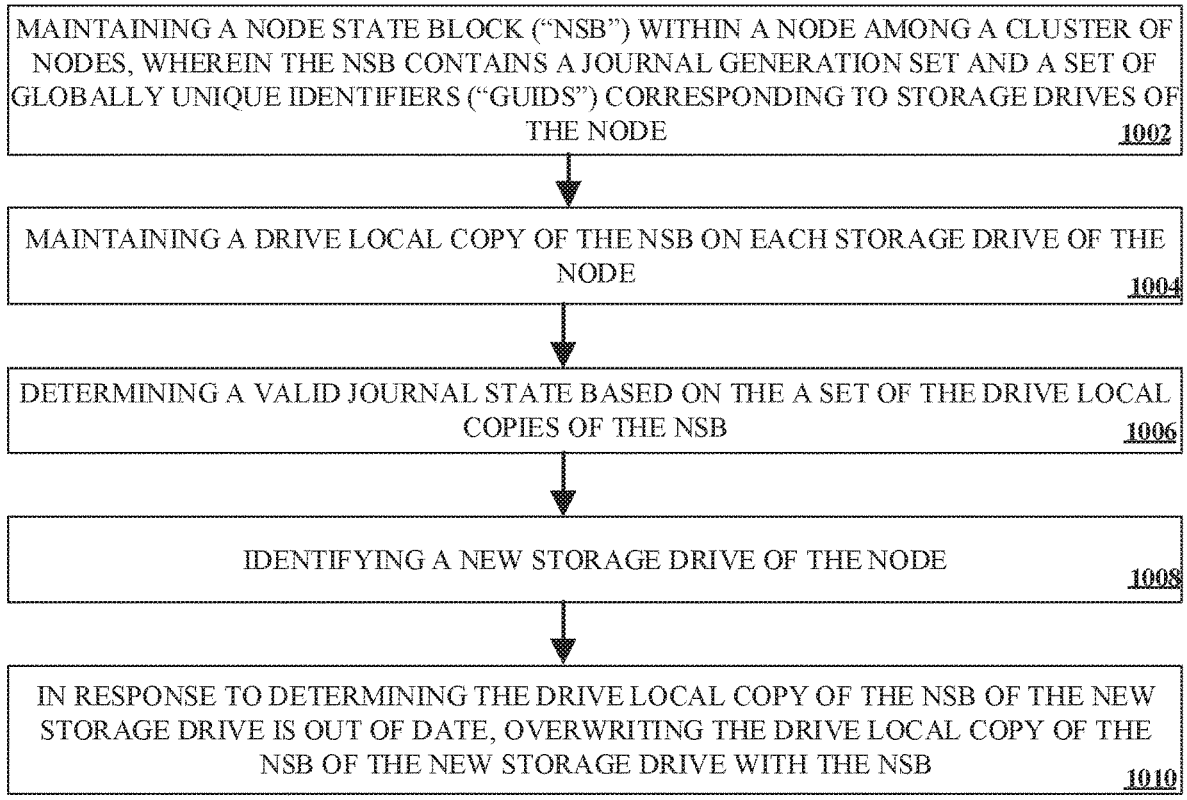
FIG. 10 illustrates an example flow diagram method for adding a new storage device to a node in accordance with implementations of this disclosure.

FIG. 10 illustrates an example flow diagram method for adding a new storage device to a node in accordance with implementations of this disclosure. At 1002, a node with a cluster of nodes can maintain an NSB, wherein the NSB contains a journal generation set and a set of globally unique identifiers corresponding to the storage drives of the node. At 1004, a drive local copy of the NSB can be maintained on each storage drive of the node. At 1006, a valid journal state can be determined based on the set of the drive local copies of the NSB.

At 1008, a new storage drive of the node can be identified.

At 1010, in response to determining the drive local copy of the NSB of the new storage drive is out of date, overwriting the drive local copy of the NSB of the new storage drive with the NSB. It can be appreciated that by identifying and introducing a new drive to the node, the count of drives used for quorum changes.

Figure 11:
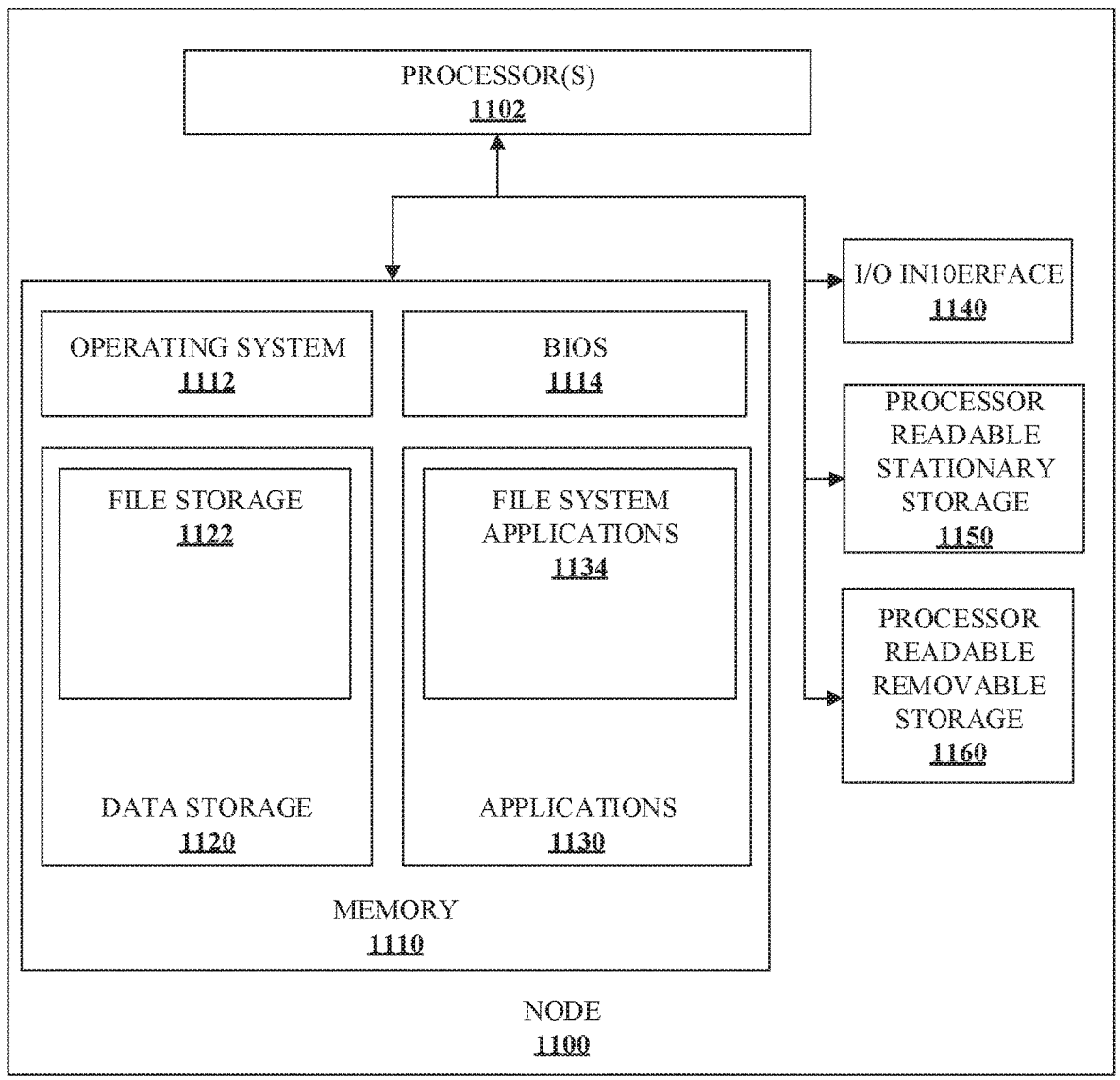
FIG. 11 illustrates an example block diagram of a node in accordance with implementations of this disclosure.

FIG. 11 illustrates an example block diagram of a node 1100 in accordance with implementations of this disclosure. Node 1100 includes processor 1102 which communicates with memory 1110 via a bus. Node 1100 also includes input/output interface 1140, processor-readable stationary storage device(s) 1150, and processor-readable removable storage device(s) 1160. Input/output interface 1140 can enable node 1100 to communicate with other nodes, mobile devices, network devices, and the like. Processor-readable stationary storage device 1150 may include one or more devices such as an electromagnetic storage device (hard disk), solid state hard disk (SSD), hybrid of both an SSD and a hard disk, and the like. In some configurations, a node may include many storage devices. Also, processor-readable removable storage device 1160 enables processor 1102 to read non-transitive storage media for storing and accessing processor-readable instructions, modules, data structures, and other forms of data. The non-transitive storage media may include Flash drives, tape media, floppy media, disc media, and the like.

Memory 1110 may include Random Access Memory (RAM), Read-Only Memory (ROM), hybrid of RAM and ROM, and the like. As shown, memory 1110 includes operating system 1112 and basic input/output system (BIOS) 1114 for enabling the operation of node 1100. In various embodiments, a general-purpose operating system may be employed such as a version of UNIX, LINUX™, a specialized server operating system such as Microsoft's Windows Server™ and Apple Computer's IoS Server™, or the like.

Applications 1130 may include processor executable instructions which, when executed by node 1100, transmit, receive, and/or otherwise process messages, audio, video, and enable communication with other networked computing devices. Examples of application programs include database servers, file servers, calendars, transcoders, and so forth. Applications 1130 may include, for example, metadata applications, and other file system applications according to implementations of this disclosure.

Human interface components (not pictured), may be remotely associated with node 1100, which can enable remote input to and/or output from node 1100. For example, information to a display or from a keyboard can be routed through the input/output interface 1140 to appropriate peripheral human interface components that are remotely located. Examples of peripheral human interface components include, but are not limited to, an audio interface, a display, keypad, pointing device, touch interface, and the like.

Data storage 1120 may reside within memory 1110 as well, storing file storage 1122 data such as metadata or LIN data. It can be appreciated that LIN data and/or metadata can relate to file storage within processor readable stationary storage 1150 and/or processor readable removable storage 1160 and/or externally tiered storage locations (not pictured) that are accessible using I/O interface 1140. For example, LIN data may be cached in memory 1110 for faster or more efficient frequent access versus being stored within processor readable stationary storage 1150. In addition, Data storage 1120 can also host policy data such as sets of policies applicable to different aspects in accordance with implementations of this disclosure. Index and table data can be stored as files in file storage 1122.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
    maintaining a node state block ("NSB") within a node among a cluster of nodes, wherein the NSB contains a journal generation set and a set of Globally Unique identifiers ("GUIDs") corresponding to storage drives of the node;
    maintaining a drive local copy of the NSB on each storage drive of the node; and
    determining a valid journal state based on the set of the drive local copies of the NSB, wherein determining the valid journal state includes determining a read quorum status and write quorum status of all the node's storage drives, wherein a read quorum status corresponds to a majority of the node's storage drives having valid copies of the NSB and the write quorum status requires at least a majority of the node's storage drives to be available.

2. The method of claim 1, further comprising:
    determining a first read quorum state based on the set of the drive local copies of the NSB;
    in response to the first read quorum state achieving quorum, reading the journal generation set from each drive local copy of the NSB;
    in response to determining that the journal generation set on a storage drive of the node has at least one of a read error, a checksum failure, or inconsistent internal generation numbers, excluding the drive from a second read quorum state; and in response to the second read quorum state passing quorum, setting the NSB to the journal generation set to a most recent NSB version associated with the second read quorum state.

3. The method of claim 2, further comprising:
overwriting the journal generation set of the drive local copy of the NSB to the most recent NSB version for each storage drive of the node whose drive local copy of the NSB had a state of failed reads, bad data, or torn writes;
in response to determining a third read quorum state passes quorum, updating the drive local copy of the NSB to the most recent NSB version for each storage drive of the node whose drive local copy of the NSB had inconsistent internal generation numbers;
in response to determining a fourth read quorum state passes quorum, processing two NSB updates;
in response to determining a fifth read quorum state passes quorum, completing any updates to the set of GUIDs in the NSB which were interrupted by a panic;
in response to determining a sixth read quorum state passes quorum, mounting the node.

4. The method of claim 3, further comprising:
in response to determining one of the first read quorum state, the second read quorum state, the third read quorum state, the fourth read quorum state, the fifth read quorum state, or the sixth read quorum failing to pass quorum, failing the mount.

5. The method of claim 1, further comprising:
taking an exclusive lock on the NSB;
incrementing the journal generation set; and
in response to determining a first write quorum state passes quorum, overwriting a drive local copy of the NSB on each storage drive of the node with the incremented journal generation set.

6. The method of claim 1, further comprising:
identifying a new storage drive of the node; and
in response to determining the drive local copy of the NSB of the new storage drive is out of date, overwriting the drive local copy of the NSB of the new storage drive with the NSB.

7. A system comprising at least one storage device and at least one hardware processor configured to:
maintain a node state block ("NSB") within a node among a cluster of nodes, wherein the NSB contains a journal generation set and a set of Globally Unique identifiers ("GUIDs") corresponding to storage drives of the node;
maintain a drive local copy of the NSB on each storage drive of the node; and
determine a valid journal state based on the set of the drive local copies of the NSB, wherein determining the valid journal state includes determining a read quorum status and write quorum status of all the node's storage drives, wherein a read quorum status corresponds to a majority of the node's storage drives having valid copies of the NSB and the write quorum status requires at least a majority of the node's storage drives to be available.

8. The system of claim 7, further configured to:
determine a first read quorum state based on the set of the drive local copies of the NSB;
in response to the first read quorum state achieving quorum, read the journal generation set from each drive local copy of the NSB;
in response to determining that the journal generation set on a storage drive of the node has at least one of a read error, a checksum failure, or inconsistent internal generation numbers, exclude the drive from a second read quorum state; and
in response to the second read quorum state passing quorum, set the NSB to the journal generation set to a most recent NSB version associated with the second read quorum state.

9. The system of claim 8, further configured to:
overwrite the journal generation set of the drive local copy of the NSB to the most recent NSB version for each storage drive of the node whose drive local copy of the NSB had a state of failed reads, bad data, or torn writes;
in response to determining a third read quorum state passes quorum, update the drive local copy of the NSB to the most recent NSB version for each storage drive of the node whose drive local copy of the NSB had inconsistent internal generation numbers;
in response to determining a fourth read quorum state passes quorum, process two NSB updates;
in response to determining a fifth read quorum state passes quorum, complete any updates to the set of GUIDs in the NSB which were interrupted by a panic;
in response to determining a sixth read quorum state passes quorum, mount the node.

10. The system of claim 9, further configured to:
in response to determining one of the first read quorum state, the second read quorum state, the third read quorum state, the fourth read quorum state, the fifth read quorum state, or the sixth read quorum failing to pass quorum, fail the mount.

11. The system of claim 7, further configured to:
take an exclusive lock on the NSB;
increment the journal generation set; and
in response to determining a first write quorum state passes quorum, overwrite a drive local copy of the NSB on each storage drive of the node with the incremented journal generation set.

12. The system of claim 7, further configured to:
identify a new storage drive of the node; and
in response to determining the drive local copy of the NSB of the new storage drive is out of date, overwrite the drive local copy of the NSB of the new storage drive with the NSB.

13. A non-transitory computer readable medium with program instructions stored thereon to perform the following acts:
maintaining a node state block ("NSB") within a node among a cluster of nodes, wherein the NSB contains a journal generation set and a set of Globally Unique identifiers ("GUIDs") corresponding to storage drives of the node;
maintaining a drive local copy of the NSB on each storage drive of the node; and
determining a valid journal state based on the set of the drive local copies of the NSB, wherein determining the valid journal state includes determining a read quorum status and write quorum status of all the node's storage drives, wherein a read quorum status corresponds to a majority of the node's storage drives having valid copies of the NSB and the write quorum status requires at least a majority of the node's storage drives to be available.

14. The non-transitory computer readable medium of claim 13, with program instructions stored thereon to further perform the following acts:

determining a first read quorum state based on the set of the drive local copies of the NSB;

in response to the first read quorum state achieving quorum, reading the journal generation set from each drive local copy of the NSB;

in response to determining that the journal generation set on a storage drive of the node has at least one of a read error, a checksum failure, or inconsistent internal generation numbers, excluding the drive from a second read quorum state; and in response to the second read quorum state passing quorum, setting the NSB to the journal generation set to a most recent NSB version associated with the second read quorum state.

15. The non-transitory computer readable medium of claim 14, with program instructions stored thereon to further perform the following acts:

overwriting the journal generation set of the drive local copy of the NSB to the most recent NSB version for each storage drive of the node whose drive local copy of the NSB had a state of failed reads, bad data, or torn writes;

in response to determining a third read quorum state passes quorum, updating the drive local copy of the NSB to the most recent NSB version for each storage drive of the node whose drive local copy of the NSB had inconsistent internal generation numbers;

in response to determining a fourth read quorum state passes quorum, processing two NSB updates;

in response to determining a fifth read quorum state passes quorum, completing any updates to the set of GUIDs in the NSB which were interrupted by a panic;

in response to determining a sixth read quorum state passes quorum, mounting the node.

16. The non-transitory computer readable medium of claim 15, with program instructions stored thereon to further perform the following acts:

in response to determining one of the first read quorum state, the second read quorum state, the third read quorum state, the fourth read quorum state, the fifth read quorum state, or the sixth read quorum failing to pass quorum, failing the mount.

17. The non-transitory computer readable medium of claim 13, with program instructions stored thereon to further perform the following acts:

taking an exclusive lock on the NSB;

incrementing the journal generation set; and in response to determining a first write quorum state passes quorum, overwriting a drive local copy of the NSB on each storage drive of the node with the incremented journal generation set.

18. The non-transitory computer readable medium of claim 13, with program instructions stored thereon to further perform the following acts:

identifying a new storage drive of the node; and in response to determining the drive local copy of the NSB of the new storage drive is out of date, overwriting the drive local copy of the NSB of the new storage drive with the NSB.

* * * * *